(12) United States Patent
Davis et al.

(10) Patent No.: US 6,251,506 B1
(45) Date of Patent: Jun. 26, 2001

(54) POLYVINYLIDENE FLUORIDE COATED ARTICLES FROM RESINS FORMABLE AT HIGH TEMPERATURES

(75) Inventors: Robert F. Davis, Wilmington, DE (US); Benjamin Simkin, Audubon, PA (US); Keith L. Truog, Crown Point, IN (US)

(73) Assignees: ATO FINA Chemicals, Inc., Philadelphia, PA (US); Tomark Industries, Inc., Wilmington, DE (US); Avery Dennison Corp., Pasadena, CA (US)

( * ) Notice: Subject to any disclaimer, the term of this patent is extended or adjusted under 35 U.S.C. 154(b) by 0 days.

(21) Appl. No.: 09/272,841

(22) Filed: Mar. 19, 1999

Related U.S. Application Data

(63) Continuation-in-part of application No. 09/081,993, filed on May 20, 1998.
(60) Provisional application No. 60/047,385, filed on May 22, 1997.

(51) Int. Cl.$^7$ .......................................................... B32B 7/02
(52) U.S. Cl. ............................. 428/213; 428/421; 428/422
(58) Field of Search .................................... 428/213, 215, 428/216, 421, 422

(56) References Cited

U.S. PATENT DOCUMENTS

| | | | |
|---|---|---|---|
| 4,364,886 | * | 12/1982 | Stassel ................................. 264/171 |
| 4,810,540 | | 3/1989 | Ellsion et al. . |
| 4,943,680 | | 7/1990 | Ellison et al. . |
| 5,203,941 | | 4/1993 | Spain et al. . |
| 5,248,732 | | 9/1993 | Drzewinski . |
| 5,304,413 | * | 4/1994 | Bloom et al. ........................ 428/215 |

FOREIGN PATENT DOCUMENTS

WO 94/03337  2/1994 (WO) .

OTHER PUBLICATIONS

Hawley's Condensed Chemical Dictionary 11$^{th}$ Ed., p. 792, Van Nostrand Reinhold Co. Publishers, Sax et al.

* cited by examiner

Primary Examiner—Bruce H. Hess
Assistant Examiner—B. Shewareged
(74) Attorney, Agent, or Firm—Stanley A. Marcus; Walter G. Maxwell; Royal E. Bright

(57) ABSTRACT

Laminates of polyvinylidene fluoride films and sheets of resins thermoformable at temperatures greater than about 500° F. (260° C.), three dimensional structures formed therefrom and processes for their manufacture and use are disclosed.

16 Claims, No Drawings

US 6,251,506 B1

POLYVINYLIDENE FLUORIDE COATED ARTICLES FROM RESINS FORMABLE AT HIGH TEMPERATURES

This application claims priority from U.S. Provisional Application Ser. No. 60/047,385 filed May 22, 1997, abandoned, and is a continuation-in-part of application Ser. No. 09/081,993, filed May 20, 1998.

BACKGROUND OF THE INVENTION

This invention relates to compositions of matter classified in the art of chemistry as laminated structures (laminates) of fluoropolymers and high temperature formable polymers, more particularly laminated structures of polyvinylidene fluoride and high temperature formable polymers selected from the group consisting of polyetherimide, polyethersulfone, polyphenylene sulfide and polyetheretherketone polymers, processes for the preparation and use of such laminates, as well as to formed products produced from the laminates.

Sheets of thermoplastic polymers may be classified in two major categories, those that can be thermoformed at low to moderate temperatures, up to 475° F. (246° C.), and those thermoformable at significantly higher temperature, from about 500° F. (260° C.) up to about 600° F. (316° C.). The former category includes polycarbonate, acrylic, polyvinyl chloride, chlorinated polyvinyl chloride and polyetherketoneketone sheet. The latter category includes polyetherimide, polyether sulfone, polyphenylene sulfide and polyetheretherketone sheet. Those sheets in the lower temperature category can be finished in three ways. They can be internally pigmented to achieve a desired color; the surface can be laminated with either a pigmented or clear film; and they can be painted. In fact, all three methods are utilized. Laminating with films is especially desirable in a number of applications, such as surface transportation, aircraft interiors and clean room enclosures, because the films provide greatly enhanced decorative and performance properties to the finished part. These properties include greater color control, improved color stability, improved cleanability and greater abrasion resistance. Because no suitable materials had been identified for forming laminates, only internal pigmentation and painting have been available for sheets in the higher temperature category. Since the introduction of these higher temperature sheets over the last 10 or 15 years, technicians in the applicable industries have sought a decorative film which can stand up to the high thermoforming temperatures these sheets must reach in order that a part will attain satisfactory geometry.

There are at least four types of decorative films used by thermoplastic sheet manufacturers for thermoforming at lower temperatures. These are polyvinyl fluoride films, acrylic films, polyvinyl chloride films and polyvinylidene fluoride-based films. With the polyvinyl fluoride, polyvinyl chloride, and acrylic films, it is well known that their upper use temperature limit is about 400° F. (205° C.), beyond which the films begin to disintegrate. The maximum use temperatures for polyvinylidene fluoride-based films had not been determined although the melting points, depending on the copolymer used, are known to be somewhat below 340° F. (170° C.) and lower. Nevertheless, it has been found that polyvinylidene fluoride films can survive intact through the high forming temperatures used in molding parts from high temperature formable polymer sheets.

Thus, sheet manufacturers can now use a film laminate with improved decorative and performance characteristics while also avoiding the problems such as environmental damage involved in painting of formed parts.

The polyvinylidene fluoride film is produced either from melted polymer or on equipment where solvents are controlled either by solvent recovery or by incineration. Many thermoformers, on the other hand, are poorly equipped to handle the solvents evaporated from paints and many operate under governmentally imposed restrictions on emission of solvents greater than present limits.

LISTING OF PERTINENT ART

While no literature relating to lamination of decorative films to high temperature formable plastic sheets and subsequent forming thereof is known to applicants, there is art related to the art of lamination and thermoforming at lower temperatures.

U.S. Pat. No. 5,203,941 to Avery Dennison discloses a method of adhering flexible decorative cover sheets among which may be polyvinylidene fluoride/acrylic sheets onto polyvinyl chloride sheet, a low temperature formable plastic. The laminates so formed are embOsed with a wood grain pattern and are intended for use as building siding.

U.S. Pat. No. 4,943,680 to Rexam Industries discloses a method of making layered coatings which inter alia may be formed from fluoropolymers such as polyvinylidene fluoride for use on formed substrates of wood, metal or plastics suitable for automobile body panels. For wood or metal, the film is adhered to the pre formed part. For plastics (all of which are molded at low temperature), the film is placed in the mold against the face which will form the surface and the panel polymer is either placed or injected behind it.

U.S. Pat. No. 4,810,540 to Rexham Corp also discloses formed structures from vinylpolymers, urethane polymers or polyacrylates surfaced with polyvinyl fluoride film used as surface coatings on shaped automobile parts. All molding is done at relatively low temperature.

PCT Application WO94/03337 to 3M discloses multilayer plastic films having a fluorinated polymer outer layer, preferably of polyvinylidene fluoride, providing surface protection for the underlying object and sufficiently flexible to conform to the contours of the underlying object at processing temperatures. The principal use is for surface coating of molded automotive parts. Use in surface protection of high temperature formable polymers or of objects formed from such polymers is not suggested.

U.S. Pat. No. 5,304,413 to DuPont discloses formed structures from polycarbonate or polyaryletherketoneketone sheets faced with polyvinyl fluoride film. Thermoforming below 200° C. is required.

In all the above art, polyvinylidene fluoride films are adhered to and/or thermoformed with contoured parts at temperatures of 475° F. or below.

SUMMARY OF THE INVENTION

The invention provides in a first composition of matter aspect, a laminar structure comprising:

a) a layer of polyvinylidene fluoride polymer-based film having a thickness of from about 10.0 to about 100 µm adhered to b) a layer having a thickness of from about 100 to 6000 µm and consisting essentially of at least one high temperature formable polymer. Special mention is made of aspects of the first composition aspect of the invention wherein the high temperature formable polymer is selected from the group consisting of (i) polyetherimide,
(ii) polyethersulfone,
(iii) polyphenylene sulfide, and
(iv) polyetheretherketone.

The tangible embodiments of the first composition of matter aspect of the invention possess the inherent applied use characteristics of being laminated sheets which are thermoformable into parts having complex shapes and which are protected from degradation by ultraviolet light on exposed surfaces, resistant to heat and fire and easily cleanable, particularly when compared to painted surfaces.

The invention provides in a first process aspect, a process for the manufacture of a laminar sheet formed from at least one substantially amorphous polymer selected from the group consisting of polyetherimide, polyethersulfone, polyphenylene sulfide, and polyetheretherketone, having a polyvinylidene fluoride polymer-based film adhered on at least one surface thereof, said process comprising:

Adhering a polyvinylidene fluoride polymer-based film to a sheet of said high temperature formable polymer to form a laminate.

The invention provides in a second process aspect, a process for forming a three dimensional shaped article from a tangible embodiment of the first composition aspect of the invention which comprises thermoforming a tangible embodiment of the first composition aspect of the invention in a mold to a desired shape under sufficient pressure and at a temperature suitable for thermoforming the high temperature formable polymer contained in said tangible embodiment of the first composition aspect of the invention.

The invention provides in a second composition aspect a shaped article formed from a tangible embodiment of the first composition aspect of the invention.

DETAILED DESCRIPTION

The manner of practicing the invention and preparing the tangible embodiments contemplated thereby will now be illustrated with respect to a specific example thereof, namely, a shaped object formed by applying a thermoforming process to a laminate formed by adhering a sheet of polyvinylidene fluoride (KYNAR® FLEX 2821) resin containing 20% by weight acrylic polymer to a sheet of polyphenylsulfone (Radel R) resin.

To form the laminate, standard lamination techniques well known in the art and which are not per se critical to the process of the invention may be employed.

An adhesive layer between the polyvinylidene fluoride polymer-based film layer and the high temperature thermoformable polymer, particularly one based on acrylic resin, is preferred.

For example, a 1.8 mil thickness PVDF film containing about 20% by weight acrylic resin (ELVACITE 2008 from ICI) may be coated on one side with an acrylic adhesive such as Adhesive 68080 and the coated side applied to a sheet of polyphenylene sulfide (Radel R). The combination is then placed in a platen press and heated at a temperature from about 275° F. to about 375° F. (149° C. to about 191° C.) to form a permanently adhered laminate.

Another well known technique to make a laminate is to continuously bond the adhesive coated film to a hot thermoplastic sheet as the sheet emerges from the extruder die and proceeds through a multiple roll stack.

The laminate may then be placed in a thermoforming mold and molded at about 550° F. (290° C.) to form a three dimensional part while taking appropriate precautions to apply uniform temperature and pressure at all points during the forming process.

The part so formed may then be used in a typical fashion for parts formed from the high temperature molding resins, such as for aircraft interior panels.

The polyvinylidene fluoride-based polymers used to form the polyvinylidene fluoride polymer-based films used in forming the laminate of the invention are well known commercial products available from Elf Atochem North America, Inc. under the KYNAR® trademark and from other producers worldwide. See, for example, "Vinylidene Fluoride Polymers", Encyclopedia of Polymer Science and Engineering, Vol. 17, 2nd Ed., page 532, 1989, John Wiley. The polyvinylidene fluoride polymer may be homopolymer or any of its known copolymers with tetrafluoroethylene, chlorotrifluoroethylene, hexafluoropropylene and the like monomers.

Admixture of certain non-fluorine containing polymers with polyvinylidene fluoride polymers to improve properties of films based on the polyvinylidene fluoride polymers, particularly pigmented films, are known (see U.S. Pat. No. 3,340,222). The acrylic polymer alloys with polyvinylidene fluoride homo and copolymers to form the polyvinylidene fluoride-based polymers contemplated by the invention and the formation of polyvinylidene fluoride polymer-based films therefrom by casting or extrusion are also well known. See, for example, the above referenced Vinylidene Fluoride Polymers Article. In addition to the aforementioned ELVACITE 2008, ELVACITE 2043 is a preferred acrylic polymer while Acryloid B-44 from Rohm & Haas Co., is another alternative acrylic polymer. From about 15% to about 40% by weight acrylic polymer is included in the polyvinylidene fluoride polymer-based film.

Polyvinylidene fluoride-based acrylic seed polymers, as described in EP 0,360,575 B2 and U.S. Pat. No. 5,349,003, may also be employed to form the polyvinylidene fluoride polymer-based film. In such an event, separate additions of acrylic polymer will not be required. In the Specification and the appended claims, when the polyvinylidene fluoride polymer-based film is stated to contain acrylic polymer or when acrylic polymer is stated to be present in such films, use of this type of seed polymer is contemplated as an equivalent to separate addition of acrylic polymer in the formation of such films.

The acrylic bonding agents employed to enhance adhesion of the polyvinylidene fluoride polymer-based film to the high temperature thermoformable polymer in forming the laminates of the invention are well known in the art for enhancing adhesion of coatings and films containing alloys of acrylics and polyvinylidene fluoride polymers to substrates. Included among these and preferred are Elvacite PMMA from ICI and Adhesive 68080 a 98% polymethylmethacrylate (PMMA) adhesive from DuPont.

As stated above, the laminate may be formed by laminating the acrylic adhesive coated polyvinylidene fluoride polymer-based film to the high temperature formable polymer sheet in a platen press at temperatures of about 275° F. (135° C.) to about 375° F. (191° C.) for a time sufficient to bond the film to the sheet, conveniently from about 3 minutes to about 30 minutes. Longer times may be required in special circumstances where heat transfer is slow through the material being pressed but ordinarily longer times than the minimum required to assure reaching the desired temperature at all points of the interface between the two sheets are unnecessary.

One of skill in the art will recognize that any convenient method of introducing the acrylic adhesive between the film and the sheet may be employed in addition to coating the adhesive on the film. Any other convenient method of applying heat and pressure to adhere the film to the sheet such as passing extruded film and sheet through a multiple roll stack after the extruder with application of the acrylic adhesive to the interface in any convenient manner. Dip, roller, brush, or doctor blade coating are illustrative of other convenient methods.

In the case where the polyvinylidene fluoride polymer-based film is extruded, the acrylic monomer to be alloyed therein, in the case where the polyvinylidene fluoride and acrylic polymers are not in the form of a seed polymer, is blended and fused with the polyvinylidene fluoride homo or copolymer during the extrusion process. Naturally, in the case where the polyvinylidene fluoride and acrylic polymers are present as seed polymers, they are already blended.

Thermoforming of the laminates may be accomplished using techniques well known in the art to form the corresponding unlaminated high temperature thermoformable polymer sheets with special attention being required to avoid surface scratches. Severe temperature and/or pressure variations over various areas of the films should also be avoided. Poor attention to maintenance of and application of uniform pressure and temperature during the molding process may result in distorted parts, discolored parts and torn or decomposed polyvinylidene polymer-based film.

Typical thermoforming problems and their solutions are given in Plastics World, April 1995, page 26.

The high temperature thermoformable polymers are all well known articles of commerce and are readily obtainable.

Typical examples of high temperature thermoformable polymers, their manufacturers and the temperatures required for their thermoforming are:

| Polymer | Tradename | Company | Thermoforming Temp. (F) |
|---|---|---|---|
| Polyetheretherketone (PEEK) | Victrex | Victrex | 500–600 |
| Polyethersulfone (PES) | Radel A | Amoco | 500–600 |
| Polyphenylene sulfide (PPS) | Radel R | Amoco | 500–600 |
| Polyetherimide (PEI) | Ultem | GE | 500–600 |

By high temperature thermoformable polymer is meant those polymers whose normally required temperature for thermoforming is about 500° F. (260° C.) or higher. These polymers are believed to be substantially amorphous in internal structure.

The invention also contemplates the use of conventional additives known to be stable at the required forming temperatures such as pigments, dyes antioxidants, plasticizers and the like.

The general techniques for making the laminates for thermoforming of low temperature thermoformable plastic sheets are set out in WO 88/07416, published Oct. 6, 1988, see for identical disclosure; U.S. Pat. No. 5,707,697 issued Jan. 13, 1998. The disclosure of the general processing techniques is incorporated herein by reference. All of the techniques described may be used for forming the laminates contemplated by the present invention. The selection of a particular general technique can readily be made by one of skill in the art, and such selection does not constitute part of the present invention and is not particularly critical thereto.

One preferred technique is that the polyvinylidene fluoride resin-based film layer be formed by casting a clear polyvinylidene fluoride resin-based film layer on a releasable carrier sheet and then casting a polyvinylidene fluoride resin-based layer containing pigment over the clear film layer so that the two film layers will be integrally bonded. Any desired adhesive or sizing layer may then be cast on top of the pigmented layer. When laminated to the high temperature thermoformable resin, after release from the carrier sheet, the clear layer becomes the outer layer of the laminar structure so formed, the pigmented layer becomes an integrally bonded inner layer and the adhesive layer bonds to the high temperature thermoformable polymer base layer. The polyvinylidene fluoride resins in the clear layer and the pigmented layer may be the same or different and may be homo- or copolymer.

EXAMPLE

A matte cameo colored PVDF/acrylic film was used to decorate a thermoformed door latch case for a DeHaviland 8 aircraft. This part was thermoformed from a sheet of Radel R, PPS, to which a matte cameo PVDF film had been laminated. The film used to decorate this part was prepared by applying paint coatings onto the surface of a flexible polyester casting film. The flexible carrier comprised a 0.92 mil thick SKC SD-28 matte polyester film. The paint coat comprised a clear coat, a color coat, and a size coat coated onto the polyester film casting sheet in that order.

The clear coat was prepared from the following formulation:

| Ingredient | Parts by weight |
|---|---|
| Cyclohexanone | 34.05 |
| polymethyl methacrylate, Elvacite 2009[2] | 12.11 |
| Tinuvin 900[3] | 0.66 |
| Solsperse 17000[4] | 0.12 |
| Kynar 500 plus (PVDF) | 31.10 |
| Cyclohexanone | 21.97 |

[2]ICI, Corporation
[3]Benzotriazole class light stabilizer, Ciba-Specialty Chemicals Corporation.
[4]Dispersing aid, Zeneca Corporation The Elvacite 2009 acrylic resin was mixed with 34.05 parts of cyclohexanone under heat applied at approximately 130 degrees F. to dissolve the acrylic resin in the solvent. To the resulting solution both Tinuvin 900, uv absorber and Solsperse 17000, dispersing aid, were added. The batch was then allowed to cool to less than 85 degrees F. The PVDF resin was then dispersed into the acrylic resin solution using a high speed disperser. The clear coat was then finished by adding the remaining 21.97 parts of cyclohexanone to reduce viscosity. The dried clear coat contained a resin composition of 72% PVDF and 28% polymethyl methacrylate resin.

The clear coat was coated on the casting sheet in a dry film thickness of about 0.15 mil. The clear coat was applied to the sheet by doctored gravure cylinder then dried and fused in a 340 degree F. impinging air drying oven.

A cameo color coat was next coated in two coating passes on the dried clear coat to obtain a total coating weight of about 76 grams per square meter. The color coat formulation was as follows:

| Ingredient | Parts by weight |
| --- | --- |
| Exxate 700[5] | 32.75 |
| BLO | 10.92 |
| Solsperse 17000[4] | 0.18 |
| polymethyl methacrylate, Elvacite 2008[2] | 6.30 |
| Titanium Dioxide, (DuPont R-960) | 24.08 |
| Kynar 2821 (air milled) (PVDF) | 25.23 |
| Buff Pigment Dispersion[1] | 0.26 |
| Red Iron Oxide Dispersion[1] | 0.18 |
| Black Pigment Dispersion[1] | 0.08 |
| Blue Pigment Dispersion[1] | 0.02 |

[5]Acetate type solvent, Exxon Corporation
[4]Dispersing aid, Zeneca Corporation.
[2]ICI, Corporation
[1]The pigment dispersions were prepared in a small media mill by dispersing the individual pigments into a vehicle composed of an acid modified methyl methacrylate-n butyl methacrylate copolymer with a glass transition temperature of about 80 degrees Celsius dissolved in two solvents, methyl ethyl ketone and toluene. The pigments dispersions contained the following pigments at the given weight solids; pigment brown 35 (black)-65.1% pigment brown 42 (buff)-60.3%, pigment ret (transparent iron oxide)-20%, and pigment blue 60—20%

The color coat formulation was prepared in a similar manner to the clear coat formulation in that the acrylic resin was first dissolved in the Exxate 700 and gamma Butyrolactone (BLO) solvent blend at a temperature of about 130 degrees F. Next, the Solsperse 17000 was added followed by the titanium dioxide white pigment which was added as a dry powder and dispersed using a high speed rotor/stator type Disperser. The batch was allowed to cool before the PVDF copolymer material component was added to the mixture and dispersed using a high speed disperser to form a dispersion of the PVDF copolymer in the acrylic resin. The tinting pigments were then added as acrylic vehicle pigment dispersions to match a cameo beige color. The dried color coat contained a resin composition of 80% PVDF copolymer and 20% acrylic.

Pigment comprised 24% of the total volume of the dried color coat (pigment volume concentration).

This color coat was coated onto the dried clear coat two separate passes using a reverse roll coater. In the first pass, liquid coating was applied by reverse roll coater then dried and fused in a three zone impinging air oven with zone temperatures of 280, 320 and 340 degrees F. The second color coat was applied directly to the dried first color coat and then dried and fused at the same oven temperatures. The first color coat was about 40 grams per square meter dried coating weight and the second color coat was about 30 grams per square meter giving a total color coat weight of 70 grams per square meter.

The DuPont 68080 adhesive coat was prepared by thinning the 68080 solvent-based adhesive with a blend of toluene and isopropyl alcohol to a Shell cup viscosity of about 33 seconds. This liquid adhesive was applied by a gravure cylinder and then dried in a multiple zone oven to reduce the residual solvent concentration to about 0.5% by weight.

The cameo colored multiple layer film prepared as described above on matte polyester film was next laminated to 60 mil PPS (Radel R) sheet using a hot roll laminator. After lamination, the polyester film was removed before the decorated sheet was thermoformed by heating the sheet to near 600 degrees F. and then drawing the sheet into the complex three-dimensional shape of the DeHaviland 8 door latch case.

The subject matter which applicants regard as their invention is particularly pointed out and distinctly claimed as follows:

We claim:

1. A laminar structure comprising:
    (a). a layer of polyvinylidene fluoride polymer based film having a thickness of from about 10.0 to about 100 $\mu$m adhered to
    (b). a layer having a thickness of from about 100 to 6000 $\mu$M and consisting essentially of at least one high temperature thermoformable polymer selected from the group consisting of
        (i) polyetherimide,
        (ii) polyethersulfone,
        (iii) polyphenylene sulfide, and
        (iv) polyetheretherketone; said laminar structure being thermoformable at temperatures greater than 260° C. without disintegration of said layer of polyvinylidene fluoride polymer based film.

2. A three dimensional shaped article formed from the laminar structure defined in claim 1.

3. A laminar structure comprising a layer of polyvinylidene fluoride polymer based film having a thickness of from 10.0 to about 100 $\mu$m adhered to a layer having a thickness of from about 100 to about 6000 $\mu$m and consisting essentially of at least one high temperature thermoformable polymer; said laminar structure being thermoformable at temperatures greater than 260° C. without disintegration of said layer of polyvinylidene fluoride polymer based film.

4. A three dimensional shaped article formed from the laminar structure defined in claim 3.

5. A laminar structure as defined in claim 3 wherein the layer of polyvinylidene fluoride polymer-based film contains an acrylic polymer.

6. A laminar structure as defined in claim 3 wherein the layer of polyvinylidene fluoride polymer-based film contains a dispersed pigment.

7. A laminar structure as defined in claim 5 wherein the layer of polyvinylidene fluoride-based polymer film contains a dispersed pigment.

8. A laminar structure as defined in claim 5 wherein the acrylic polymer is present in the polyvinylidene fluoride polymer-based film layer at from about 15% to about 40% by weight.

9. A laminar structure as defined in claim 3 wherein the high temperature thermoformable polymer is thermoformable at temperatures above about 260° C.

10. A laminar structure as defined in claim 3 wherein the high temperature thermoformable polymer is formable at temperatures from about 260° C. to about 316° C.

11. A laminar structure as defined in claim 3 wherein the polyvinylidene fluoride polymer-based film is in the form of an outer clear coating layer and an integrally connected inner pigmented layer.

12. A laminar structure as defined in claim 11 wherein the polyvinylidene fluoride-based resin in the pigmented layer comprises a polyvinylidene fluoride copolymer.

13. A laminar structure as defined in claim 11 wherein the films in both the clear layer and the pigmented layer comprise an alloy of polyvinylidene fluoride resin and acrylic resin.

14. A laminar structure as defined in claim 11 wherein the polyvinylidene fluoride resin in the clear layer and the pigmented layer are different co-polymers of vinylidene fluoride.

15. A laminar structure as defined in claim 11 wherein the clear layer contains about 28% by weight acrylic resin blended with polyvinylidene fluoride resin and the pigmented layer comprises about 20% by weight acrylic resin blended with the polyvinylidene fluoride resin.

16. A laminar structure as defined in claim 3 wherein the polyvinylidene fluoride resin-based film layer is bonded to a 60 mil thick high temperature thermoformable polymer sheet.

* * * * *